(12) United States Patent
Buchstaller et al.

(10) Patent No.: US 9,627,890 B2
(45) Date of Patent: Apr. 18, 2017

(54) CIRCUIT ARRANGEMENT

(75) Inventors: Dominic Buchstaller, Dechsendorf (DE); Johannes Reinschke, Nürnberg (DE)

(73) Assignee: SIEMENS AKTIENGELLSCHAFT, Munich (DE)

(*) Notice: Subject to any disclaimer, the term of this patent is extended or adjusted under 35 U.S.C. 154(b) by 580 days.

(21) Appl. No.: 14/348,683

(22) PCT Filed: Aug. 29, 2012

(86) PCT No.: PCT/EP2012/066788
§ 371 (c)(1),
(2), (4) Date: Mar. 31, 2014

(87) PCT Pub. No.: WO2013/045194
PCT Pub. Date: Apr. 4, 2013

(65) Prior Publication Data
US 2014/0300185 A1    Oct. 9, 2014

(30) Foreign Application Priority Data
Sep. 29, 2011    (DE) .......................... 10 2011 083 741

(51) Int. Cl.
*H02J 3/32*        (2006.01)
*H02J 3/38*        (2006.01)
*H02J 7/35*        (2006.01)

(52) U.S. Cl.
CPC .............. *H02J 3/381* (2013.01); *H02J 3/32* (2013.01); *H02J 3/383* (2013.01); *H02J 7/35* (2013.01);
(Continued)

(58) Field of Classification Search
CPC .... H02J 3/32; H02J 3/38; H02J 3/381–3/383; H02J 3/46; H02J 7/34; H02J 7/35;
(Continued)

(56) References Cited

U.S. PATENT DOCUMENTS 5,969,438 A * 10/1999 Odaohara ............. H02J 7/0031
307/64
2009/0230689 A1 * 9/2009 Burra ...................... F03D 9/003
290/55
(Continued)

FOREIGN PATENT DOCUMENTS

DE    102009027228    12/2010
DE    102010005567    7/2011
(Continued)

OTHER PUBLICATIONS

German Office Action for German Priority Patent Application No. 10 2011 083 741.8, issued Mar. 16, 2012, 6 pages.
(Continued)

*Primary Examiner* — Levi Gannon
(74) *Attorney, Agent, or Firm* — Slayden Grubert Beard PLLC

(57) ABSTRACT

A circuit arrangement has a bidirectional AC/DC converter connected to a first side of a DC/DC converter at a DC side of the AC/DC converter via first electric switch. The AC/DC converter is connected to a second side of the DC/DC converter at the DC side of the AC/DC converter via a second electric switch. The first side of the DC/DC converter is connected to a third electric switch and can be connected to an energy storing device via said switch. The second side of the DC/DC converter is connected to a fourth electric switch and can be connected to an energy generating device via said switch. The AC/DC converter can be connected to the electric supply grid at the AC side of the AC/DC converter. A control device controls the switches and the converters.

12 Claims, 6 Drawing Sheets

(52) U.S. Cl.
CPC ............ *Y02B 10/14* (2013.01); *Y02E 10/563* (2013.01); *Y02E 10/566* (2013.01); *Y02E 70/30* (2013.01); *Y10T 307/305* (2015.04); *Y10T 307/367* (2015.04); *Y10T 307/391* (2015.04); *Y10T 307/729* (2015.04)

(58) Field of Classification Search
CPC .......... H02M 1/10; Y02B 10/10; Y02B 10/14; Y02E 10/563; Y02E 10/566; Y02E 70/30; Y10T 307/305; Y10T 307/313; Y10T 307/328; Y10T 307/336; Y10T 307/359; Y10T 307/367; Y10T 307/391; Y10T 307/724; Y10T 307/729
USPC ...................... 307/18, 19, 21–23, 25, 26, 29
See application file for complete search history.

(56) References Cited

U.S. PATENT DOCUMENTS

| | | |
|---|---|---|
| 2010/0096921 A1 | 4/2010 | Ishida et al. |
| 2010/0198421 A1 | 8/2010 | Fahimi et al. |
| 2010/0219688 A1* | 9/2010 | Shyu ........................ H02J 7/35 307/66 |
| 2011/0057724 A1* | 3/2011 | Pabon .................. H02M 7/219 327/581 |
| 2011/0115295 A1* | 5/2011 | Moon ....................... H02J 3/32 307/65 |
| 2011/0148205 A1 | 6/2011 | Moon |
| 2013/0093381 A1* | 4/2013 | McGinley ............. H02J 7/0068 320/107 |
| 2014/0132073 A1* | 5/2014 | Satake .................... H02J 1/102 307/64 |

FOREIGN PATENT DOCUMENTS

| | | |
|---|---|---|
| DE | 102011083741.8 | 9/2011 |
| EP | 2317623 | 5/2011 |
| EP | 2330712 | 6/2011 |
| EP | PCT/EP2012/066788 | 8/2012 |
| JP | 6-178461 | 6/1994 |
| WO | 2011/101030 | 8/2011 |

OTHER PUBLICATIONS

English language International Search Report for PCT/EP2012/066788, mailed Dec. 11, 2012, 2 pages.

WIPO English language translation of Written Opinion for PCT/EP2012/066788, downloaded from WIPO website Mar. 31, 2014, 4 pages.

* cited by examiner

CIRCUIT ARRANGEMENT

CROSS REFERENCE TO RELATED APPLICATIONS

This application is based on and hereby claims priority to International Application No. PCT/EP2012/066788 filed on Aug. 29, 2012 and German Application No. 10 2011 083 741.8 filed on Sep. 29, 2011, the contents of which are hereby incorporated by reference.

BACKGROUND

The invention relates to a circuit arrangement for the variable interconnection of energy sources and energy consumers.

Presently, decentralized energy generation units, for example photovoltaic systems, are in widespread use in commercial and private buildings. In addition, it should be assumed that in future rechargeable batteries of electrically operated vehicles will be connected to the grid in greater quantities in the same buildings. Said rechargeable batteries are both an energy sink and an energy source. Further devices which may become more prevalent are wind generators and water-based generators, for example.

Typically, all such devices are nowadays constructed with a respective dedicated AC/DC connection. A first disadvantage of this is that there is a certain degree of redundancy of the power electronics components, which has a negative impact on costs and installation space. Another disadvantage is that it is difficult to monitor the energy flow between the supply grid and the individual devices available.

EP 2317623 A1 has disclosed a so-called "demand-response" design, in which a wind energy source and a PV system are connected to the supply grid via a common AC-to-DC converter. The AC-to-DC converter is in this case controlled by a signal from the supply grid.

US 2010/0198421 A1 has disclosed a connection system, in which a so-called "intelligent energy management system" controls the energy flow on the basis of, inter alia, energy prices. The system has a common AC-to-DC converter in combination with a multiport DC-to-DC converter. All of the DC devices are connected to a common DC bus via pulse-width-modulated semiconductor switches. One disadvantage with the described design is that the multiport DC-to-DC converter is a complex device and the DC devices need to be actuated in a complex manner in order to enable the connection to the common DC bus.

SUMMARY

One possible object is to specify an improved circuit arrangement with which in particular redundant power electronics built-on components are reduced.

The inventors propose a circuit arrangement for the variable interconnection of energy sources and energy consumers has the following elements: a bidirectional AC-to-DC converter for converting a DC voltage into direct current, and vice versa. Furthermore, the circuit arrangement has a DC-to-DC converter and at least four electrical switches, in particular power electronics semiconductor switches. Finally, the circuit arrangement comprises a control device for actuating the switches and the converters.

In this case, the elements are connected to one another in the following way: the AC-to-DC converter is connected on its DC side to a first side of the DC-to-DC converter. In this case, the connection is interruptible by a first of the electrical switches. Furthermore, the AC-to-DC converter is connected on its DC side to a second side of the DC-to-DC converter. This connection is interruptible via a second of the electrical switches.

The first side of the DC-to-DC converter is also connected to a third of the electrical switches and is connectable, via said switch, to an energy storage device, while the second side of the DC-to-DC converter is connected to a fourth of the electrical switches and is connectable, via said switch, to an energy generation device. The AC-to-DC converter is finally connectable on its AC side to the electrical supply grid.

The AC-to-DC converter is bidirectional, i.e. can be used for both directions of power flow. Therefore, it can direct power both from the supply grid to the DC sinks and direct power which is generated by devices on the DC side to the supply grid. The AC-to-DC converter is used jointly by the DC components, as well as the DC-to-DC converter.

The DC-to-DC converter enables energy transfer from and to the various DC devices such as the energy generation device(s) or the energy storage device(s). In this case, the DC-to-DC converter is used for stepping up or stepping down the respective voltages. As a result, they are made usable for the DC side of the AC-to-DC converter for feeding to the grid, for example, or else for charging an electrical rechargeable battery. The DC-to-DC converter can be configured to be either unidirectional or bidirectional.

The electrical switches enable the selective connection of the various elements of the circuit arrangement to one another. In this case, it is not necessary to enable pulse-width-modulated actuation for the electrical switches; a close/open option is sufficient.

The control device performs the actuation of the individual components in the circuit arrangement such as the electrical switches and the converters. The circuit arrangement advantageously makes it possible in the case of a particularly simple design to connect energy generation units and storage devices flexibly to one another and to the supply grid on the DC side. For this, a minimum number of power electronics components and switches is required.

Preferably, the circuit arrangement comprises a communication device. This can comprise individually or in combination a plurality of functions. Thus, the communication device can be configured to receive price information from the electricity supplier. A further function is communication with other devices, for example for remote control and input by the user. The communication device can comprise, for example, a network connection or an Internet connection. The communication device can furthermore comprise a PLC (powerline communications) link. Other forms of connection can also be incorporated.

In an advantageous configuration, the control device optimizes the energy flow. For this, the following parameters are taken into consideration individually or in combination: electricity price information both for the withdrawal and feeding of electrical energy from/to the supply grid, state of charge information in respect of connected energy storage devices and optimization targets predetermined by the user. The optimization is in this case expediently based on mathematical optimization principles, for example dynamic programming or linear optimization. Preferably, the control device does not require any user inputs apart from the optimization target and possible boundary conditions for the optimization.

The optimization is preferably repeated with a temporal frequency which can be set in order to respond to events such as, for example, an unannounced change in the electricity prices. On the basis of the result of the most up-to-date optimization, the control device controls the components of the circuit arrangement in order to achieve the optimization target.

Particularly advantageously, the described circuit arrangement solves the problem of the interconnection of a plurality of terminals with the supply grid using a minimum number of switches and a high-efficiency DC-to-DC converter. In this case, it is possible to use standard components both for the DC-to-DC converter and for the AC-to-DC converter. In contrast to known solutions, it is not necessary to use, for example, quick-response semiconductor switches with pulse width modulation together with a multiport DC-to-DC converter, such as in US 2010/0198421, for example.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
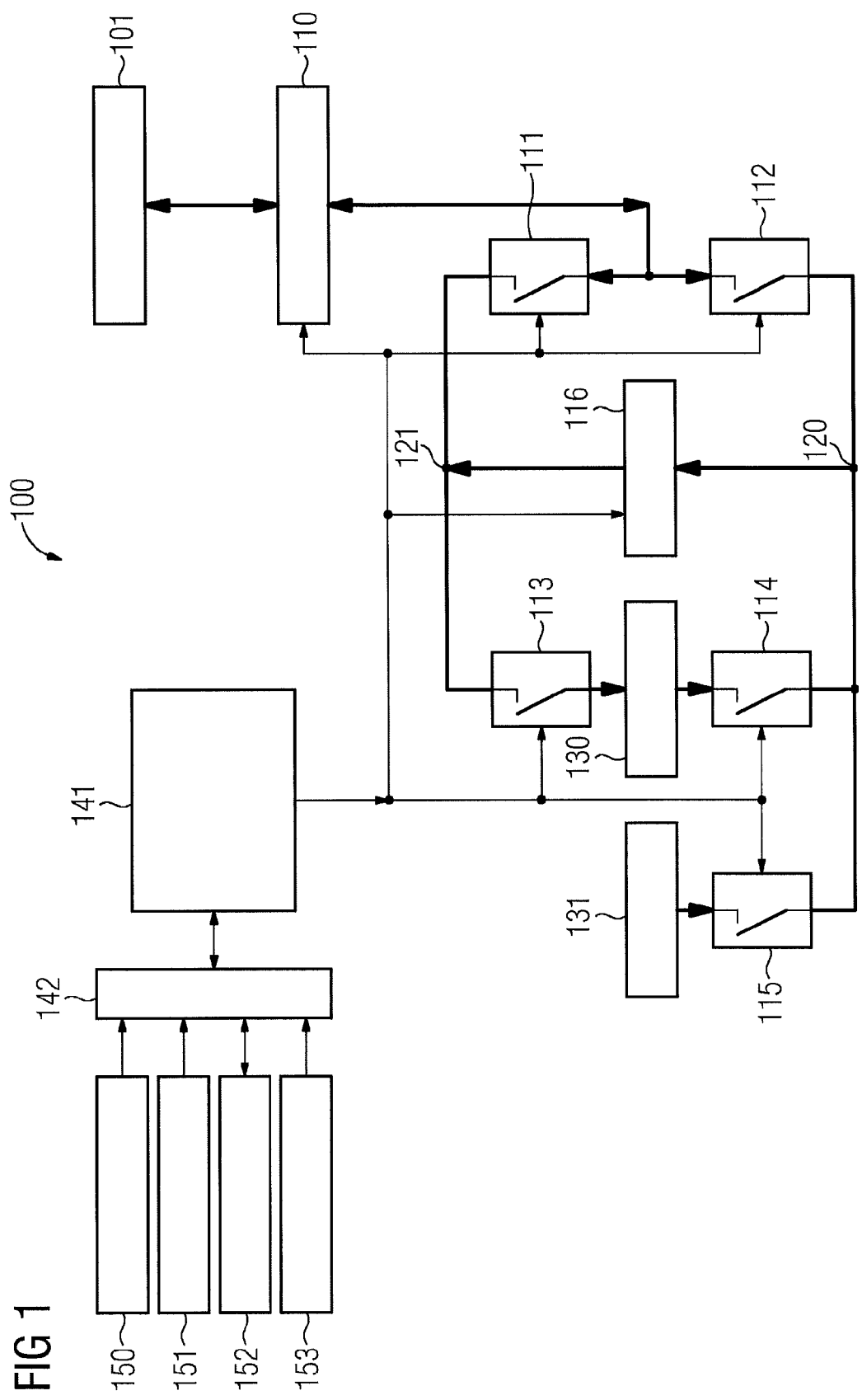
FIG. 1 shows a graph for a circuit arrangement comprising a unidirectional DC-to-DC converter and a plurality of DC devices.

Reference will now be made in detail to the preferred embodiments of the present invention, examples of which are illustrated in the accompanying drawings, wherein like reference numerals refer to like elements throughout.

FIG. 1 shows an exemplary energy supply system 100 which is arranged in a commercial building and has a connection to the external electrical supply grid 101. The supply grid 101 is generally used for supplying electricity in the building. The building is equipped with a photovoltaic system 131. Furthermore, the building has connection possibilities for charging electrically operated vehicles. The rechargeable batteries of possibly connected automobiles are illustrated symbolically as rechargeable battery 130 in FIG. 1. The storage option for the rechargeable battery 130 in this case varies with the number of connected vehicles and can also be completely dispensed with temporarily. The state of charge of the rechargeable battery 130 and therefore the possibilities for outputting and withdrawing power can also vary.

The available electrical systems supply grid 101, rechargeable battery 130, photovoltaic system 131 are interconnected in the energy supply system 100 in a particular way in order to achieve a flexible connection of the elements with as little complexity as possible. For this, the energy supply system 100 comprises a unidirectional DC-to-DC converter 116 and a bidirectional AC-to-DC converter 110. The AC-to-DC converter 110 is in this case connected to the supply grid 101 on the AC side. On the DC side, the AC-to-DC converter 110 is connected via a first switch 111 to the output side of the unidirectional DC-to-DC converter 116. On the DC side, the AC-to-DC converter 110 is also connected to the input side of the DC-to-DC converter 116 via a second switch 112.

The rechargeable battery 130 can be used both as power provider and as consumer. The rechargeable battery 130 is therefore connected to both sides of the DC-to-DC converter 116, to the output side via a third switch 113 and to the input side via a fourth switch 114. In this case, it is expedient if individual rechargeable batteries of individual vehicles are each connected separately via dedicated switches since the state of charge of the rechargeable batteries can differ markedly.

Since the photovoltaic system 131 is a pure energy generation unit, said photovoltaic system is connected merely to the input side of the DC-to-DC converter 116 via a fifth switch 115.

The energy supply system 100 furthermore comprises a control device 141. The control device 141 has connections to the elements to be controlled of the energy supply system 100, namely the switches 111 . . . 115 and the converters 110, 116. It is possible to integrate control of the photovoltaic system 131 in the control device 141 as well. However, it is advantageous if the control device operates independently of the design of the specific photovoltaic system 131 and therefore does not also control said system.

The control device 141 furthermore comprises a communication device 142, which is used for recording external data and outputting information. Thus, the communication device 142 records data from the energy supplier in relation to electricity prices 150. Furthermore, the communication device 142 records weather forecast data 151. User inputs 152 also need to be input via the communication device 142. Finally, the communication device 142 records state-of-charge data 153 in relation to a connected rechargeable battery 130. The communication device 142 is also configured to output information on the status of the control device and the connected electrical devices, for example on a connected display screen (not shown).

Finally, the control device 141 comprises a microprocessor-based optimization unit. The optimization unit takes the available data such as, for example, state-of-charge data 153 and electricity prices 150 and computes, for example, by linear optimization, actuation of the electrical components which best meets a predetermined optimization target with the predetermined possibilities.

The electrical lines in the energy supply system 100 are provided with arrows which illustrate the possible directions of power flow. Various scenarios for the actual wiring are specified below in the further figures together with an exemplary course of action for a day.

For the following example, it is assumed that the communication device 142 has access to the following information:
the up-to-date electricity price which is made available by the energy supplier;
a weather forecast which gives an indication of how much power can be generated by the photovoltaic system 131;

the up-to-date state of charge of the connected rechargeable battery 130 of an electric vehicle;

an electricity price statistic which makes it possible to predict the electricity price beyond that day.

The electricity price is in this case, for the present example, intended to follow a course which has two maximum values between 6 and 8 o'clock in the morning and 6 and 8 o'clock in the afternoon, when a large amount of power is drawn from the supply grid. In addition, the electricity price typically increases slightly when the weather does not enable a good supply from solar systems.

For the exemplary day used below, sunny weather until 4 o'clock in the afternoon is predicted, followed by rain. The user of the system would like to use the electric automobile at around 10 o'clock in the evening for two hours and requires charging of the automobile battery to at least 50% for this. Furthermore, a default setting has been made by the user or administrator of the energy supply system 100 to the effect that the energy costs should be minimized as the optimization target and the profits made from a feedback to the supply grid 101 should be maximized. The present example begins at 6 o'clock in the morning and the state of charge of the rechargeable battery 130 is assumed to be full. The optimization unit computes in this example hourly an optimum energy flow which is matched to the assumed conditions and events at that time and in the future. The computation time period is only exemplary and can also be selected differently; for example, it is also possible for a recalculation to be started every five minutes.

Figure 2:
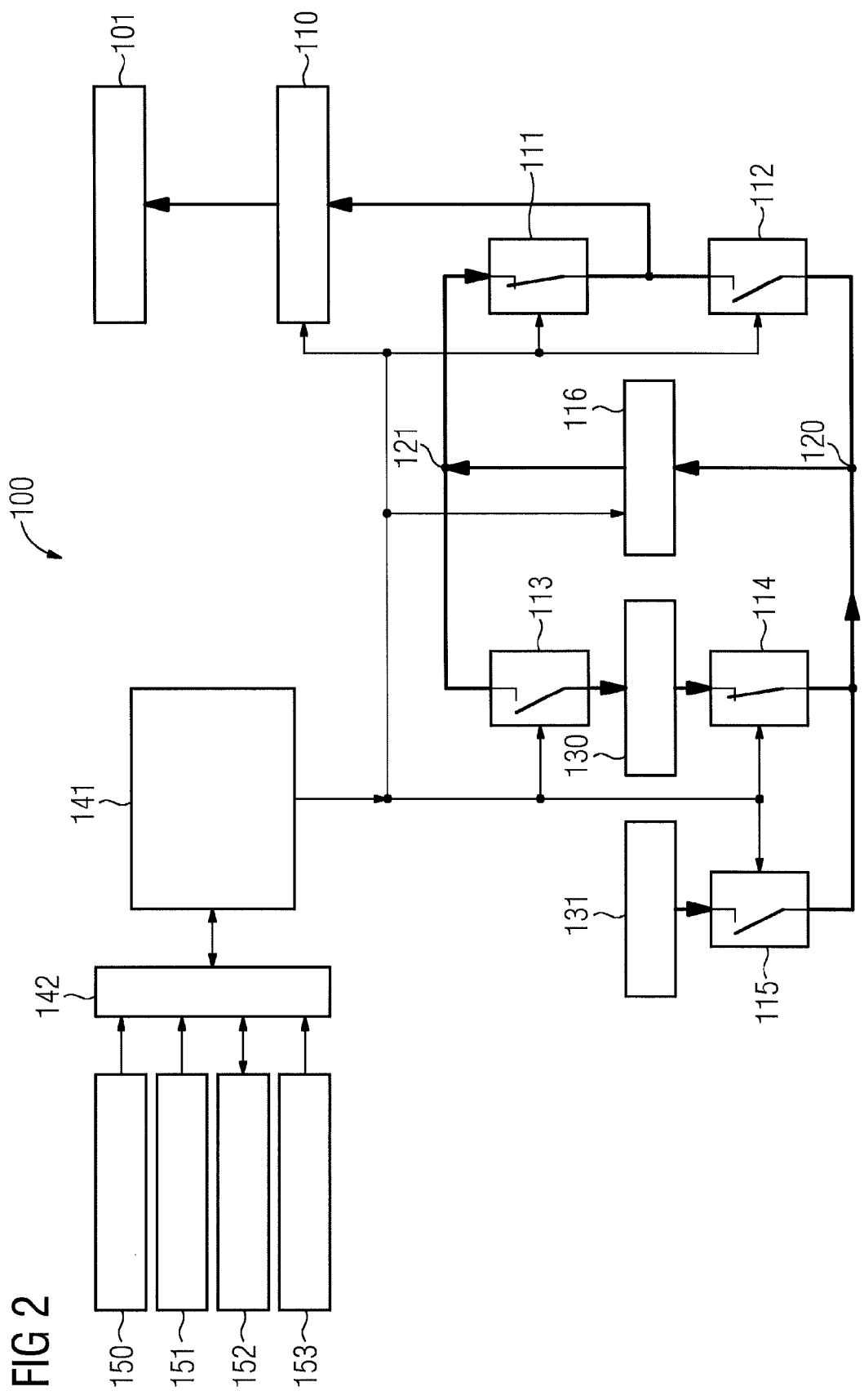
FIG. 2 shows a power flow chart for the circuit arrangement comprising a unidirectional DC-to-DC converter when energy is fed from a battery back to the supply grid.

The optimized energy flow in the example is as follows:

From 6 to 8 o'clock in the morning: the generally high consumption in this time results in an increased electricity price. Since the automobile is not yet being used for some time, the energy stored in the rechargeable battery 130 is fed back in its entirety to the supply grid 101. The corresponding actuation of the electrical components is shown in FIG. 2. Thus, for this purpose, the first switch 111 and the fourth switch 114 are closed, while the remaining switches 112, 113, 115 remain open. As a result, the rechargeable battery 130 is connected to the input side of the DC-to-DC converter 116, which brings the voltage of the rechargeable battery 130 to a level which is suitable for the AC-to-DC converter. The DC-to-DC converter 116 is connected on the output side to the AC-to-DC converter 110.

Thus, there is a direct current path for feeding the energy out of the rechargeable battery 130 back to the supply grid 101. Quick switching of the switches 111 . . . 115 is not necessary for this and pulse width modulation is also not implemented. Instead, the switches 111 . . . 115 remain in the corresponding switching state as long as the external conditions do not change (for example the rechargeable battery 130 is no longer available) or a new calculation of the optimization unit demands a change.

Figure 3:
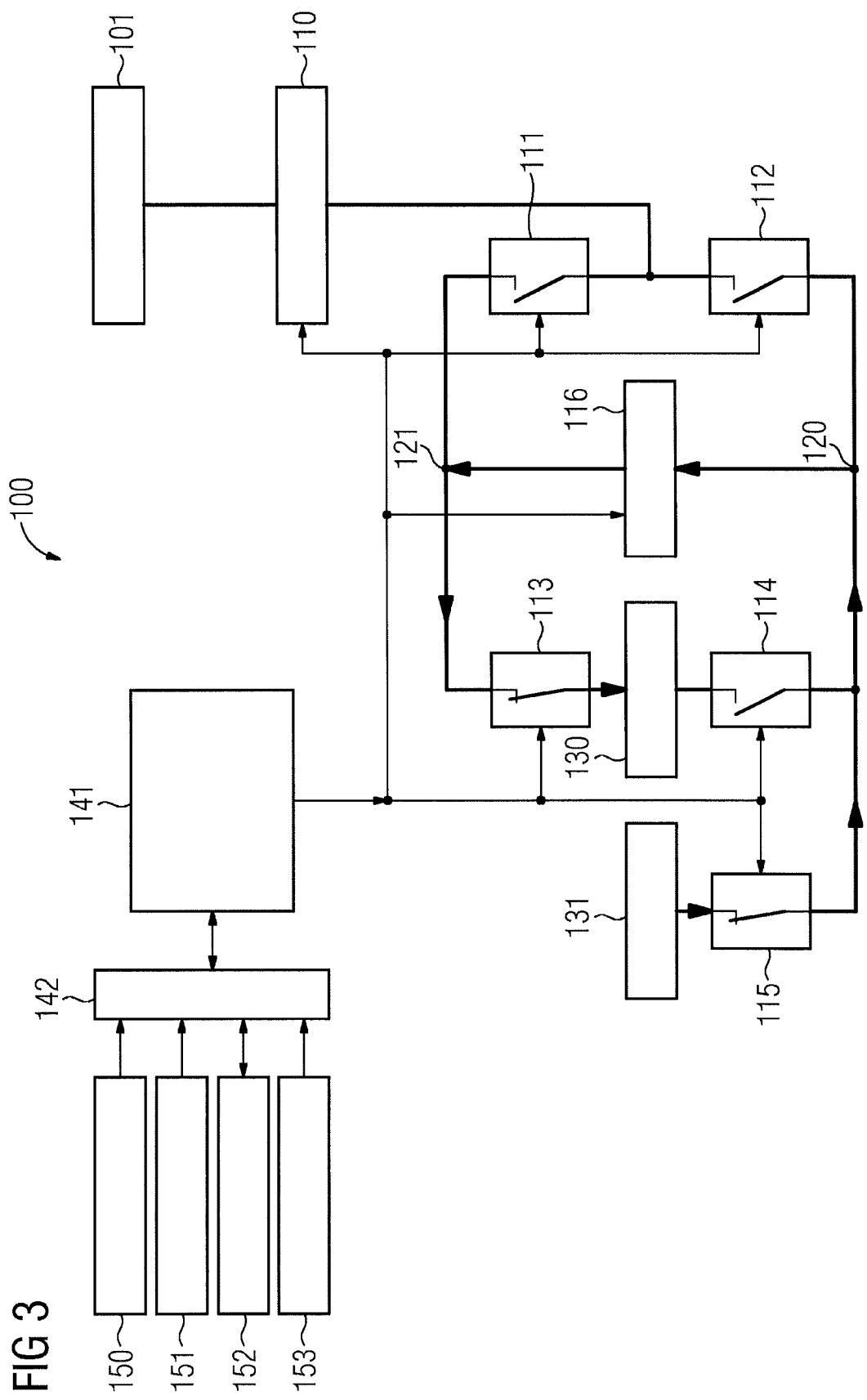
FIG. 3 shows a power flow chart for the circuit arrangement comprising a unidirectional DC-to-DC converter when the battery is charged by energy from a photovoltaic system.

From 8 o'clock in the morning to 2 o'clock in the afternoon: the electricity prices are moderate and the electrical power of the photovoltaic system 131 could be fed back to the supply grid 101. However, the calculation of the optimization unit shows that it is more favorable to feed the energy from the photovoltaic system 131 into the rechargeable battery 130 and to store it there in order to be able to sell it later at a higher price. In this example, this is due to the poor weather to be expected which means that the power to be expected from the photovoltaic system 131 is low during the afternoon. The corresponding actuation of the electrical components is shown in FIG. 3. Thus, for this purpose, the third switch 113 and the fifth switch 115 are closed, while the remaining switches 111, 112, 114 remain open. As a result, the rechargeable battery 130 is connected to the output side of the DC-to-DC converter 116. On the input side, the DC-to-DC converter 116 is connected to the photovoltaic system 131. Therefore, there is a direct current path for charging the rechargeable battery 130 from the photovoltaic system 131. In this case, a suitable transformation of the voltage levels by the DC-to-DC converter 116 can be performed. In this case, too, quick switching of the switches 111 . . . 115 is not necessary. As long as the external conditions do not change (for example when the rechargeable battery 130 is fully charged) or a new calculation of the optimization unit demands a change, the switching state is maintained.

Figure 4:
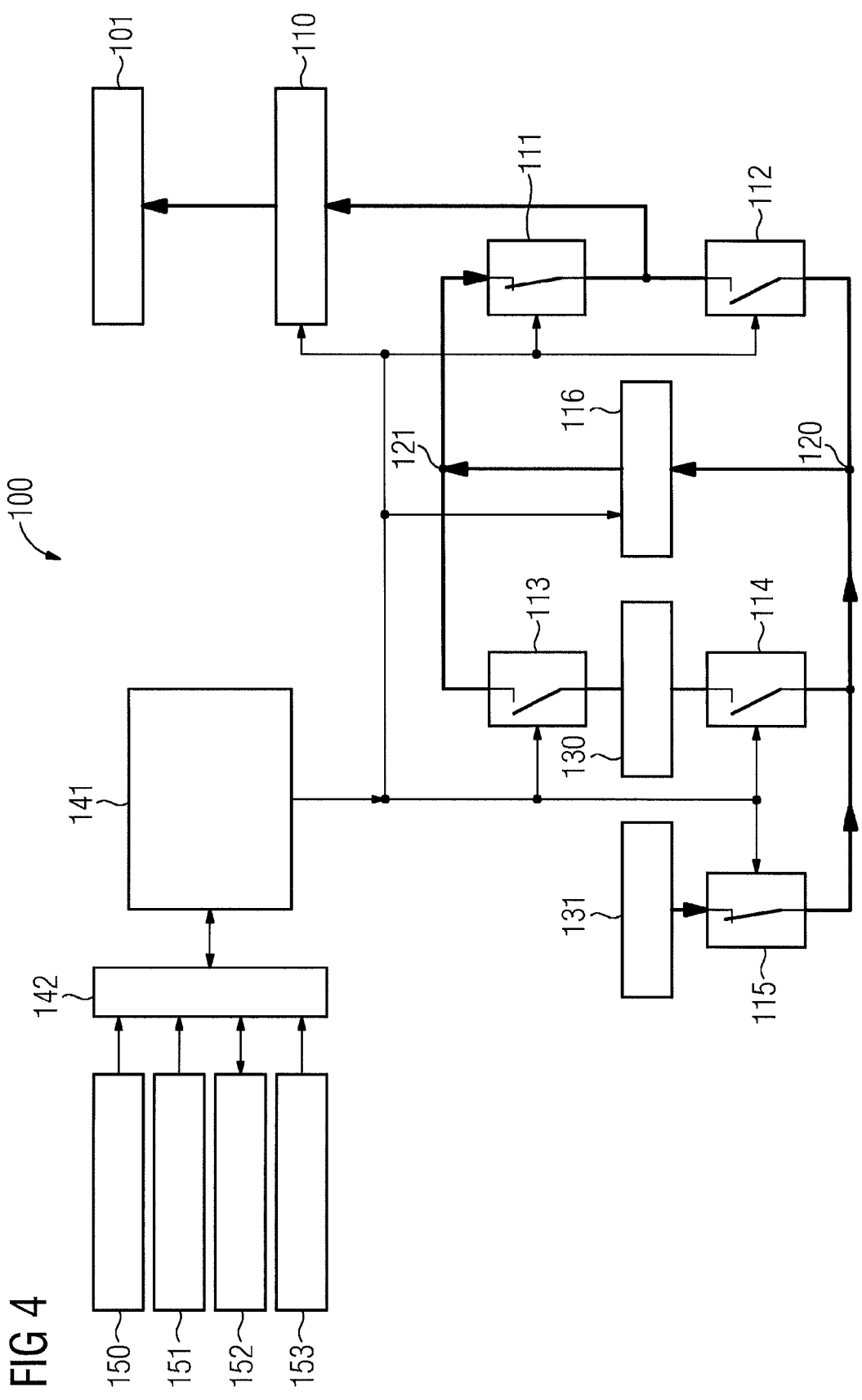
FIG. 4 shows a power flow chart for the circuit arrangement comprising a unidirectional DC-to-DC converter when energy is fed from the photovoltaic system back to the supply grid.

From 2 to 3 o'clock in the afternoon: the state-of-charge data 153 shows that the rechargeable battery 130 is fully charged. Further charging is therefore useless and the optimization unit determines that, from this point on, the power generated by the photovoltaic system 131 is fed back to the supply grid 101. The corresponding actuation of the electrical components is shown in FIG. 4. Thus, for this purpose, the first switch 111 and the fifth switch 115 are closed, while the remaining switches 112 . . . 114 remain open. As a result, the DC-to-DC converter 116 is connected on the input side to the photovoltaic system 131. On the output side, there is the connection to the AC-to-DC converter 110. Thus, there is a direct current path for the feeding of the power from the photovoltaic system 131 back to the supply grid 101. In this case, in turn suitable transformation of the voltage levels by the DC-to-DC converter 116 can be performed.

From 3 to 5 o'clock in the afternoon: as predicted, the sky is overcast and rain and clouds mean that the electrical energy from the photovoltaic system 131 can virtually go down to zero. Since it is assumed in this example that the electricity prices are variable and are also matched in up-to-date fashion, as a result the electricity price increases. Since the automobile is still not being used for some time, the optimization unit computes that it is sensible to feed the energy stored in the rechargeable battery 130 back to the supply grid 101. The corresponding actuation of the electrical components is again shown in FIG. 2. The first switch 111 and the fourth switch 114 are closed again, while the remaining switches 112, 113, 115 remain open.

From 5 until 6 o'clock in the afternoon: the weather changes contrary to the forecast and it becomes sunny again. According to the computation results of the optimization unit, the reincreased power of the photovoltaic system 131 is now used to increase the charging of the rechargeable battery 130 as far as possible for the then following electricity price maximum between 6 and 8 o'clock in the evening. The corresponding actuation of the electrical components is shown in FIG. 3 again.

From 6 to 8 o'clock in the evening: the generally high consumption at this time, as expected, results in a high electricity price. Since there is still time left before recharging of the rechargeable battery 130, the energy stored in the rechargeable battery 130 is fed back to the supply grid 101 completely. The corresponding actuation of the electrical components is shown in FIG. 2.

Figure 5:
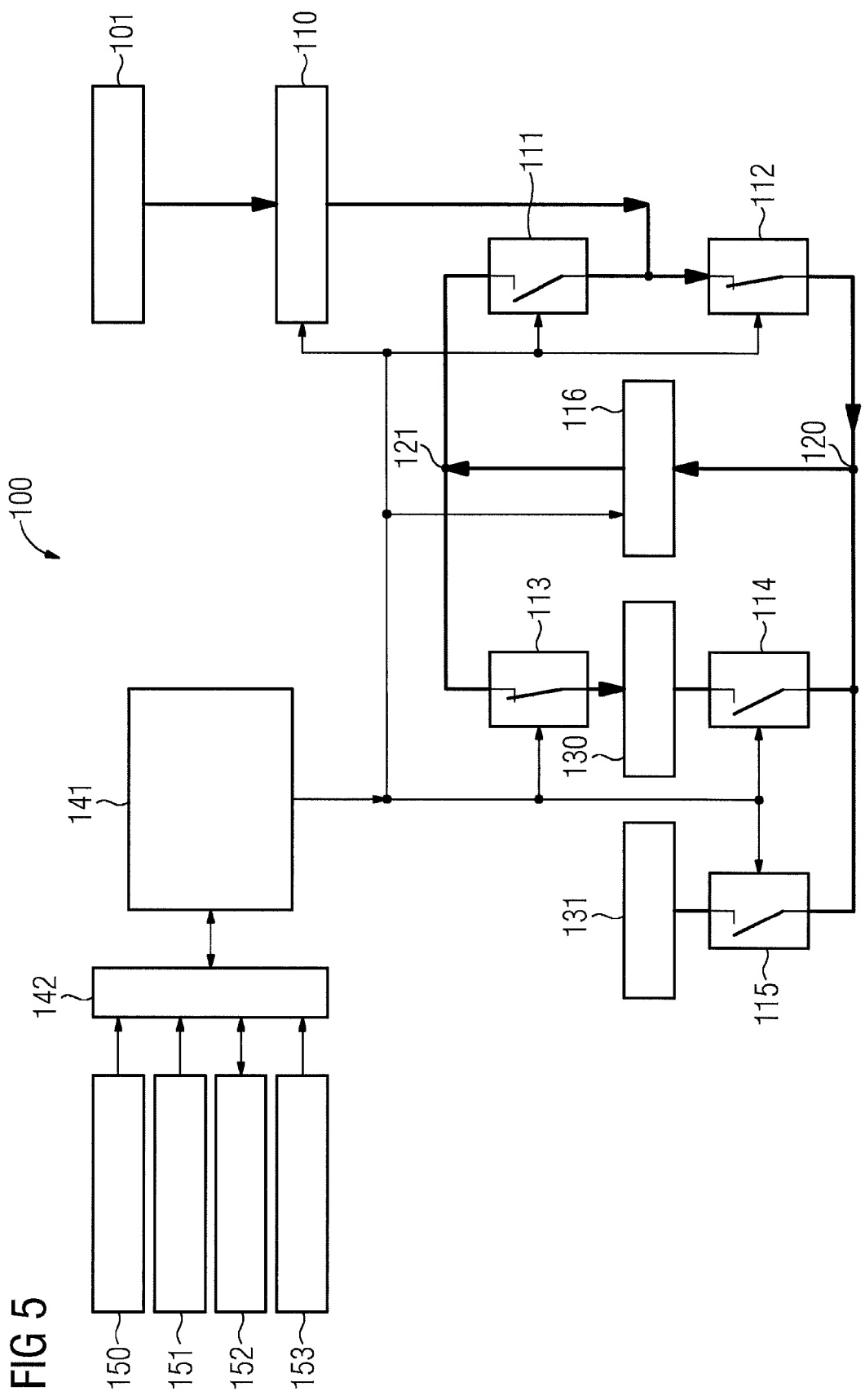
FIG. 5 shows a power flow chart for the circuit arrangement comprising a unidirectional DC-to-DC converter when the battery is charged from the supply grid.

From 8 until 10 o'clock in the evening: the electricity prices are moderate. At this time, the charging of the rechargeable battery 130 is brought to the 50% required by the user. Since the photovoltaic system 131 in the present example is not providing any more energy at this time, the required energy is drawn from the supply grid 101. Since the electricity prices at night are typically at their lowest, charging to over 50% is first performed at night. The corresponding actuation of the electrical components is shown in FIG. 5. Thus, for this purpose, the second switch 112 and the third switch 113 are closed, while the remaining switches 111, 114, 115 remain open. As a result, the rechargeable battery 130 is connected to the output side of the DC-to-DC converter 116. The DC-to-DC converter 116 is connected on the input side to the AC-to-DC converter 110. Thus, there is a direct current path for charging the rechargeable battery 130 from the supply grid 101.

From 10 until 12 o'clock at night: the system is in the rest state since the photovoltaic system 131 is not providing any current and the rechargeable battery 130 is not connected to the system.

From 12 until 6 o'clock at night: the electricity prices are low. The rechargeable battery 130 is charged fully from the supply grid 101 in order to be available for a return feed when electricity prices are high. The corresponding actuation of the electrical components in turn corresponds to that in FIG. 5.

Figure 6:
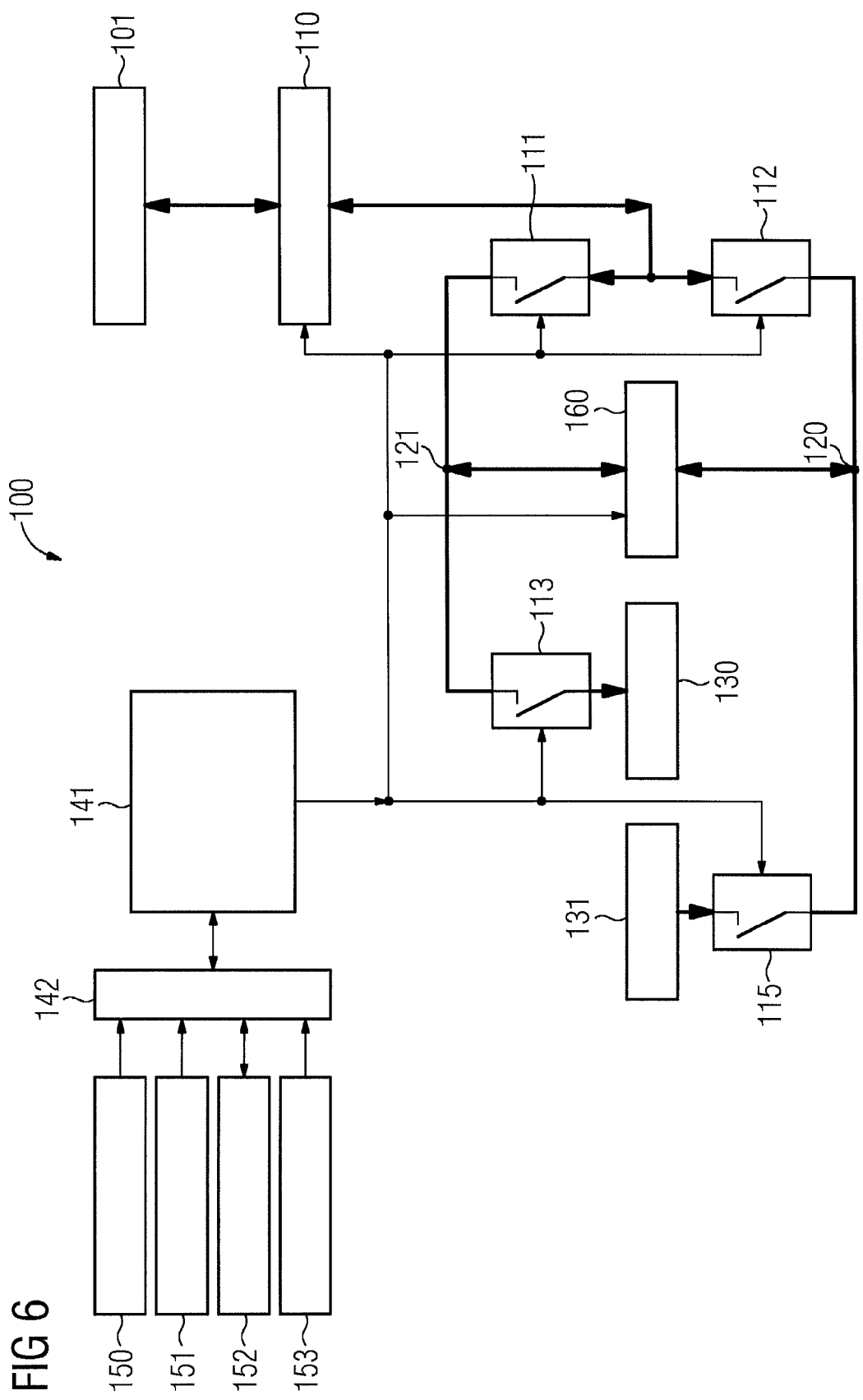
FIG. 6 shows a power flow chart for a circuit arrangement comprising a bidirectional DC-to-DC converter and a plurality of DC devices.

An alternative design of the system is shown in FIG. 6. In this case, the components correspond in the majority of cases to those in the previous figures. However, in this case a bidirectionally operating DC-to-DC converter 160 is used instead of the unidirectionally operating DC-to-DC converter 116. This makes it possible to omit the fourth switch 114 and the connection of the rechargeable battery 130 via this fourth switch 114. In this case, the rechargeable battery is connected to the bidirectional DC-to-DC converter 160 only on the input side via the third switch 113. The circuit scenarios shown for the previous example can likewise be realized with the bidirectional DC-to-DC converter 160, wherein, when the rechargeable battery 130 is connected to the bidirectional DC-to-DC converter 160, the third switch is always closed. By virtue of the interconnection of the bidirectional DC-to-DC converter 160 as shown in FIG. 6, the full flexibility is maintained with only four switches 111 . . . 113, 115.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A circuit arrangement for a variable interconnection of energy generation and storage devices, comprising:
   a bidirectional AC-to-DC converter having a DC side and an AC side, the AC side being connected to an electrical supply grid;
   a first electrical switch connected to the DC side of the AC-to-DC converter;
   a DC-to-DC converter having first and second sides, the first side of the DC-to-DC converter being connected to the DC side of the AC-to-DC converter via the first electrical switch;
   a second electrical switch which connects the DC side of the AC-to-DC converter to the second side of the DC-to-DC converter;
   a third electrical switch connected to the first side of the DC-to-DC converter;
   an energy storage device connected to the first side of the DC-to-DC converter via the third electrical switch;
   a fourth electrical switch connected to the second side of the DC-to-DC converter;
   an energy generation device connected to the second side of the DC-to-DC converter via the fourth switch; and
   a control device to selectively actuate the electrical switches and the converters.

2. The circuit arrangement as claimed in claim 1, wherein the DC-to-DC converter is a bidirectional DC-to-DC converter.

3. The circuit arrangement as claimed in claim 1, wherein the DC-to-DC converter is configured to be unidirectional,
   a fifth electrical switch is connected to the second side of the DC-to-DC converter, and
   the second side of the DC-to-DC converter is connected to the energy storage device via the fifth electrical switch.

4. The circuit arrangement as claimed in claim 3, wherein the control device closes the fifth and first electrical switches and opens the second through fourth electrical switches, such that a current path connects the energy storage device via the DC-to-DC converter and the AC-to-DC converter to the electrical supply grid, in order to feed electrical energy stored in the energy storage device back to the electrical supply grid.

5. The circuit arrangement as claimed in claim 3, wherein the control device closes the third and fourth electrical switches and opens the first, second and fifth electrical switches in order to feed the energy storage device from the energy generation device.

6. The circuit arrangement as claimed in claim 5, wherein the control device closes the fourth and first electrical switches and opens the second, third and fifth electrical switches in order to feed energy generated in the energy generation device back to the electrical supply grid.

7. The circuit arrangement as claimed in claim 6, wherein the control device comprises an optimization unit, configured to compute optimum actuation of the electrical switches taking into consideration predeterminable boundary conditions, wherein the boundary conditions comprise at least one type of information selected from the group consisting of:
   outputs as low as possible for current drawn from the electrical supply grid,
   intakes as high as possible for current fed back to the electrical supply grid,
   electricity price fixed by an energy supplier,
   electricity price statistically varying based on time of day,
   controlling use of the energy storage device,
   weather forecast, and
   controlling state of charge of the energy storage device.

8. The circuit arrangement as claimed in claim 5, wherein the control device closes the second and the third electrical switches and opens the first, fourth and fifth electrical switches in order to charge the energy storage device from the supply grid.

9. The circuit arrangement as claimed in claim 8, wherein the control device comprises an optimization unit, configured to compute optimum actuation of the electrical switches taking into consideration predeterminable boundary conditions, wherein the boundary conditions comprise at least one type of information selected from the group consisting of:
   outputs as low as possible for current drawn from the electrical supply grid,
   intakes as high as possible for current fed back to the electrical supply grid,
   electricity price fixed by an energy supplier,
   electricity price statistically varying based on time of day, controlling use of the energy storage device,
weather forecast, and
controlling state of charge of the energy storage device.

10. The circuit arrangement as claimed in claim 3, wherein the control device closes the fourth and first electrical switches and opens the second, third and fifth electrical switches in order to feed energy generated in the energy generation device back to the electrical supply grid.

11. The circuit arrangement as claimed in claim 3, wherein the control device closes the second and the third electrical switches and opens the first, fourth and fifth electrical switches in order to charge the energy storage device from the supply grid.

12. The circuit arrangement as claimed in claim 1, wherein the control device comprises an optimization unit, configured to compute optimum actuation of the electrical switches taking into consideration predeterminable boundary conditions, wherein the boundary conditions comprise at least one type of information selected from the group consisting of:
outputs as low as possible for current drawn from the electrical supply grid,
intakes as high as possible for current fed back to the electrical supply grid,
electricity price fixed by an energy supplier,
electricity price statistically varying based on time of day,
controlling use of the energy storage device,
weather forecast, and
controlling state of charge of the energy storage device.

* * * * *